Jan. 12, 1937. A. M. BOOTHBY ET AL Re. 20,235

COLLAPSIBLE PAPER CAN

Original Filed Jan. 10, 1933 2 Sheets-Sheet 1

Inventors
Albion M. Boothby
Marshall E. Gazette
by Everett E. Kent
Attorney

Jan. 12, 1937. A. M. BOOTHBY ET AL Re. 20,235

COLLAPSIBLE PAPER CAN

Original Filed Jan. 10, 1933 2 Sheets-Sheet 2

Inventors
Albion M. Boothby
Marshall E. Gazette
by Everett Kent
Attorney

Reissued Jan. 12, 1937

Re. 20,235

UNITED STATES PATENT OFFICE 20,235

COLLAPSIBLE PAPER CAN

Albion M. Boothby, Newton, and Marshall E. Gazette, Boston, Mass., assignors, by mesne assignments, to Lily-Tulip Cup Corporation, New York, N. Y., a corporation of Delaware Original No. 2,037,675, dated April 14, 1936, Serial No. 650,986, January 10, 1933. Application for reissue November 19, 1936, Serial No. 111,644

12 Claims. (Cl. 229—4.5)

This invention relates to improvements in collapsible paper cans.

It is especially useful when applied to the larger sort of single service cans, such as may be used in distribution of bulk ice cream by manufacturers to retailers, or in distribution of other moist or frozen food products; but cans embodying the invention are available also for other uses.

The manufacturer customarily delivers bulk ice cream in ten or twenty quart cans. These fit into the retailer's refrigerating unit, and there the same cans serve as storage units for retail distribution. When such cans are made of metal, as has been customary for many years, they must be returned to the ice cream factory for use again. The used cans are unsanitary, until cleaned, especially in summer. The cleaning preparation involves repeated expense. Rough handling, abuse, and deleterious chemical effects necessitate outlays for upkeep. In the back and forth movement the rather large weight and bulk of metal cans cause a substantial proportion of the high transportation costs of the business; and replacements for actual loss of cans are a still more considerable item of expense, the metal cans being initially costly.

The idea of using single service paper containers has therefore been advanced, for better sanitation, elimination of cleaning costs, and reduction of costs of transportation and handling owing to the smaller weight per unit and the elimination of empties;—but this has brought other and new problems, not hitherto satisfactorily solved, for which it is an object of the invention to provide a solution as well as to provide further improvements.

In a single service system the number of cans required is much larger, for doing a given volume of business per any given period; and this, with the much larger number of cans that must be kept in reserve, since none are coming back from customers, demands storage space for a very large number of cans. Also freight costs on new paper cans are high, because of their bulk, unless they can in some way be condensed.

The present invention provides for large paper cans which may be greatly reduced in volume to save space during shipment and storage, and also provides improvements in method of manufacture and in the finished product.

The invention provides a can whose wall is naturally cylindrical. Consequently, the walls return easily to cylindrical shape, after being collapsed for storage. Also, the improved can is capable of being set up quickly, by hand, without a machine being required to mold some partly prepared plane walls into concave form; and because of its natural cylindrical shape the can of the invention is strong and tight, without metal reinforcement, although made wholly of paper.

Other features are that the can of the invention packs well with like cans for the hardening operation of ice cream, in which case, while stacked, the can provides for access of the cooling air to the whole cylindrical length of each can, including the body of cream which is surrounded by the flange of the cover, thus avoiding the making of soft ends of cream. Also it provides for spacing the cover disk upward to prevent the cream, in a full can, from freezing to the cover. Also it provides other improved operative details affecting the top cap closure, among which are reinforcing beadings, for strength; separable disk and flange, for the opening of a full can, while leaving the top edge of can wall reinforced so that its strength continues as the can is gradually emptied; and leaving the same strong for convenience of the sales person in tapping the scoop which is used in serving.

The invention attains these various objects and results by employing a paper tube, preformed as a cylinder of desired diameter and length, for the can body; creasing the tube walls longitudinally, at 90° distances, or more frequently, to make hinge lines for the collapsing, and for expanding; beading inward the paper edges at the bottom of the body, to hold a tight bottom disk; beading outward the paper edges at the top, to fit an annular, spaced, flange on an oversized cap; setting the crimping head of the cap directly on the bead of the can top, thus spacing the cap disk upward from the contained ice cream and preventing its freezing contact therewith; crimping the top cover disk only lightly into the cap flange, for the perfect covering of the can during transportation and handling, yet making a joint at which the disk is readily separable as an integral unit, from its flange, when the ice cream is to be opened to be dispensed, thus leaving its erstwhile cap-flange standing thereafter as a re-enforcement around the top end of the opened can.

By reason of the flexibility of the curved paper material, the bare cylindrical tube, not yet assembled with its end closures, may be collapsed sidewise to a substantially flat position. Quadrants of its walls are, in effect, hinged together at the creases which have been made in the cylindrical formation, so that two opposite semi-cylinders can, while retaining powers of resiliency, be flattened approximately to planes, by simply pressing them together. Any convenient number, say twenty-five, flattened tubes, may then be packed in a relatively small space, for shipment and storage. This disposes of the bulky part of the can. The bottom disks, being naturally flat, as disks, pack solidly together; and the top caps, being flat with only short flanges, can also be packed together relatively solidly.

By virtue of its tendency resiliently to return to cylindrical form, a collapsed can may be assembled for use quickly and easily by hand. After releasing the flattened tube, so that it returns toward cylindrical form, it is only necessary to insert and press the bottom plane disk to its seat on the interior bead at the bottom of the tubular body; whereupon the can automatically resumes a shape which is approximately cylindrical, with its top end ready and open. The inflow of a thick liquid, as ice cream, spreads the upper portion of the can body to a more perfect circular form, which the cap cover, consisting of disk with flange closely fitting the top bead of the cylindrical wall, will close and reenforce.

In the case of ice cream, while full cans are stacked close together in a cold chamber, the hardening operation is promoted by the spacing of the cap flange at a little distance from the can body, which occurs because the bead over which it fits is out-turned. This space permits circulation of air against the can wall to the full height of can. Later, condensation occurs in this space; sometimes this flange becomes securely frozen to the top part of the can body.

To open the can, the loosely crimped disk part of the top, which has been preserved from freezing to the top of can contents, can be lifted out as an integral unit, by means of any conveniently penetrative tool, thus opening the entire top of the can, but leaving that which was the cap flange now remaining in a binding and reenforcing relation around the lip of the can wall.

It is intended that the patent shall cover, by suitable expression in the appended claims, whatever features of patentable novelty exist in the invention disclosed.

Figure 1:
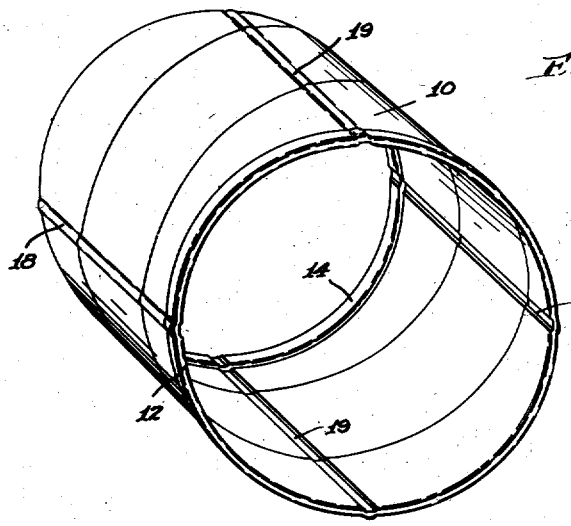
Figure 1 is an isometric showing of a tubular can body embodying features of the invention.

Referring to the drawings, the cylindrical tube 10 of helically wrapped paper, may be regarded as representative of paper tubes in general which are suitable for use as paper can bodies, such being well known. Long tubes of the wrapped paper of desired diameter having been cut into lengths suitable for individual can bodies, each is rolled or beaded at its ends. That end which is to be the mouth of a can has its stock rolled outward, to provide the annular exterior bead 12; and the bead 14 at the other end is rolled interiorly so as to constitute a seat on which a bottom closure disk 16 may engage. This disk 16 being circular, and of diameter to fit snugly against the tube walls when pressed to its seat 14, a strong liquid-tight joint results between disk and can body. It is of course necessary that the bottom disk be sufficiently stiff, and this will be so if it be of corrugated paper board 16a. For special strength this may be backed on one side by card board 16b; or card board alone is sometimes enough, especially if very thick, and laminated.

Figure 2:
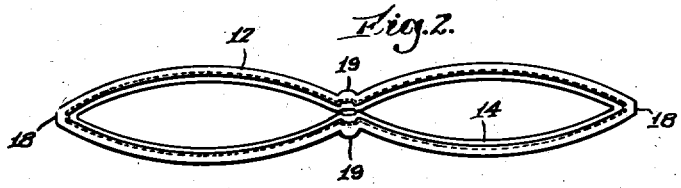
Figure 2 is an elevation showing the tube of Figure 1 collapsed, but not compressed to flatness.
Figure 3:
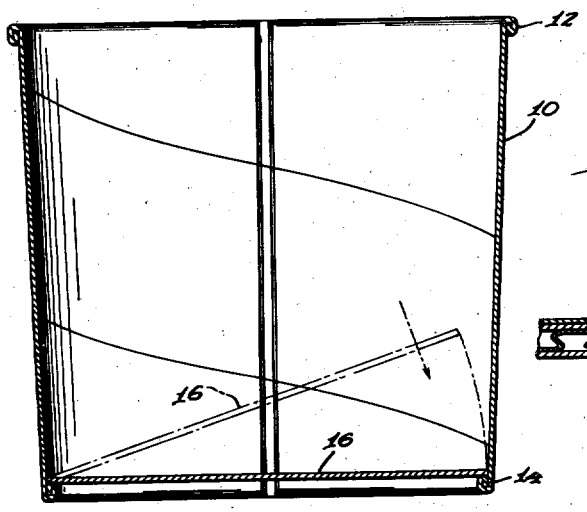
Figure 3 is an elevation, in medial section, showing the tube re-opened, and with the bottom closure disk inserted, the dotted lines indicating an intermediate position of the disk while being inserted.
Figure 8:
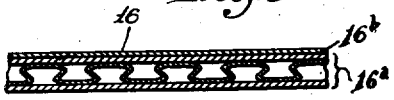
Figure 8 is an enlarged sectional view of a fragment of the bottom closure disk of Figure 3.

The invention provides for the temporary and resilient collapsing of this cylindrical tube 10 into a substantially flat form, to reduce bulk for shipping and storage. The walls of tube 10 are impressed with longitudinally extending creases 18, 19, which may be made by creasing dies in a manner already known for dealing with paper. These creases 18 are 180° apart; or indeed, and preferably, the creases 18, 19, are 90° apart or even are at shorter intervals, provided always that there be at least one pair 180° apart, to serve the function here portrayed at creases 18. When the tube is thereafter compressed by forces applied in opposite directions laterally, the paper semi-cylinders which are delimited by a pair of creases 180° apart tend to become parallel planes. They turn on those two creases as end hinges, and swing together, more or less as seen in Figure 2, tending to reduce to zero the angle between themselves. When thus put under the necessity of departing from its natural cylindrical form, each wall yields at one of these straight lines or zones of relative weakness, 18, 19, parallel to the axis as the place at which the major bending of the paper walls shall naturally occur. In the quadrant style of creasing, and at the stage of progress represented in Figure 2, the angle between adjacent quadrants is reduced toward zero at creases 18, and is enlarged or opened at creases 19; and the quadrant surfaces between creases each retain approximately their native quadrant forms, to which the paper tends resiliently to return when pressure is released. A number of tubes, each collapsed to the extent as in Figure 2, may be piled together; and the whole pile then further collapsed to a stage of approximate flatness, both of the pile and of the individual tubes therein, as in Figure 9; and this condensation of tubes constitutes a compact package capable of economical transportation and storage. The flexibility of the cylindrical paper walls will permit of this condensation if there be only the creases 18; but the wall flattens somewhat more easily if there are also the creases 19; and would shape more easily still if there were others (not shown) between these latter, taking less pressure when flattening fifty at once.

But in each case a measure of resilience remains in the two or more ply paper material of the wall, so that each section tends to resume its cylindrical form when the pressure upon it is released, and this is true also at the creases, though less in degree. The creases need not extend through the top and bottom beads. Although these beads are necessarily exaggerated in thickness in the drawings, they are in fact thicker than the can walls at other places. But this does not much increase the total thickness of the assembled package, for, in stacking, they can be alternately reversed and slightly offset from each other.

Figure 9:
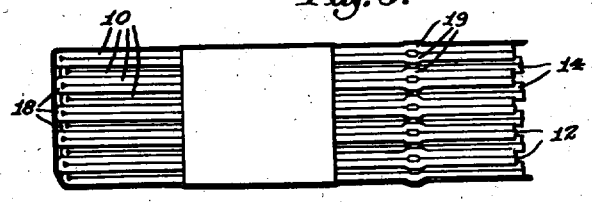
Figure 9 is an elevation of a bundle of stacked can bodies, each body being collapsed and compressed to flatness.

The product of the invention in both the conditions shown in Fig. 2 and in Fig. 9 has its advantages. While a maximum saving in space is afforded when the cylinders are flattened to the degree illustrated in Fig. 9, yet if the bodies are maintained in this condition for a sufficient period of time the tendency of the sections to spring back into curvilinear form is diminished. The containers may also be packed in a less compact condition, such for example as illustrated in Fig. 2, in which condition a less but very material saving in space is still accomplished, without any danger of diminishing the springing back tendency of the sections. Reference in the claims to "collapsed" "collapsing" and "collapsible" should be understood as comprehending either and both of the conditions above described in connection with Figs. 2 and 9.

The bottom closure disks 16 may be stacked, or packed in groups, apart from the bodies 10; or one disk 16 may be associated with each collapsed tube 10, either interiorly or exteriorly thereof.

Figure 4:
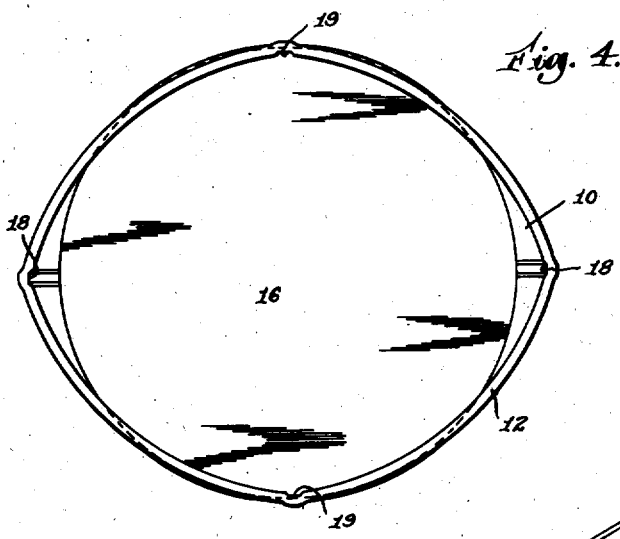
Figure 4 is a top plan of the empty can of Figure 3.
Figure 5:
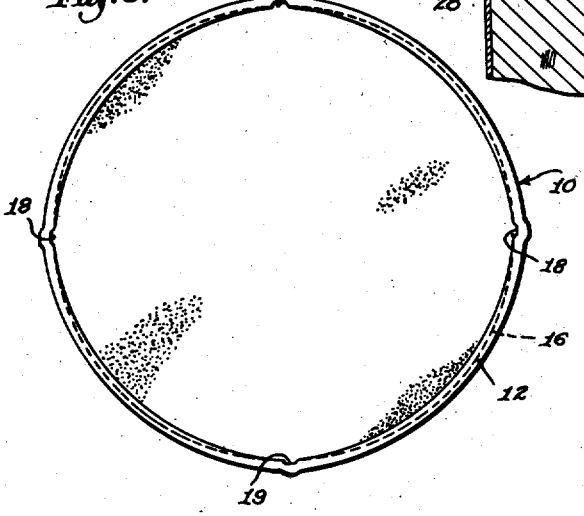
Figure 5 is a top plan of the can as it appears when filled with ice cream or other contents.
Figure 7:
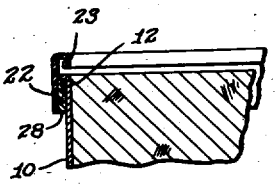
Figure 7 is a view similar to Figure 6 showing the cap flange remaining and serving as a binding reenforcement for the top of the body, after the cap disk has been removed.

At destination, a collapsed tube may be opened easily to a tubular shape, as it automatically tends to approach its original cylindrical shape. One of the stiff disks 16 then may be pressed into it until that disk is seated on interior bead 14. In going down to its seat the edge of the disk will rub against and spread the tube walls to circular form, and the circumference of the disk, when seated, will be fitting snugly against the tube walls. Experience has shown that this will be adequately liquid-tight. The remainder of the body 10 will then be a cylinder, somewhat distorted, as indicated in Figure 4, but with the mouth wide open. When filled, the outward pressure of fluid contents on the walls expands the can body to approximate its original true circular cross-section, as represented in Figure 5, so that a flanged cap cover may be applied easily and safely, aiding the restoring of body top to its original roundness.

While the cap cover may be of any ordinary construction, preferably it consists of a disk 20 crimped as at 23 into only a slight engagement with a short cylindrical flange 22, in a manner to permit of a yielding of the crimp for the separation of the disk therefrom with comparative ease under certain conditions. When the flange 22 becomes frozen on the can as happens at 28 under the low temperatures of the ice cream hardening room, the disk 20 may be penetrated with any convenient instrument 30, and may be thus pried loose from its flange, and be lifted out as a unit, to open the can; leaving the flange 22 binding and reenforcing the can rim during the operation of dispensing contents from the can, to which it will be perhaps firmly adhering by reason of moisture congealed as at 28 between the flange and the top part of the can body 10. The can may then be re-covered by the disk at any time, with reasonable effectiveness.

The cap cover has its annular crimp 23 close up against the flange 22 so that the crimp butts against the top edge of the can body, at the bead 12, whereby a free space 24 stands above contents of the can, and no part of the cap dips into the contents. This free space 24 constitutes an air pocket for accommodating air entrapped as the cap is applied, which, otherwise, would tend to force contents out of the can at its bottom; and is a clearance which prevents the cover from becoming frozen to contents.

Ice cream customarily is poured into the large cans by the manufacturer in thick liquid form, and then is hardened in freezing temperatures in a room where cans are stacked closely together. It is important that circulation space be provided between containers, and that all parts of each can be subjected uniformly to the cold. If the cans of the invention are packed solidly in mutual contact the cap flanges 22, automatically space their bodies apart. And the space underlying between a cap flange and its adjacent can body permits circulation within the flange, thereby to keep the contents of the can at this area equally as cold as at other areas along the can.

Figure 10:
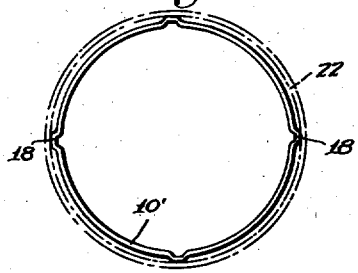
Figure 10 is a modified form of container having no top roll or bead, and having the creases engaging the cover flange, which latter is shown by dotted lines.
Figure 6:
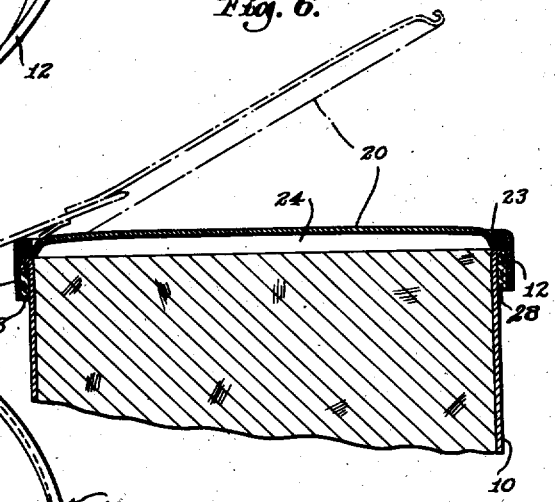
Figure 6 is an elevation, in medial section, of the upper portion of a covered frozen can, showing, in dot and dash lines, the cap disk partially removed.

In a simplified and preferred form the bead 12 at the top of the can may be omitted; and the creases 18 extending to the extreme top afford support points for cap flange 22 on a diameter larger than the diameter of the can body, to engage that flange and space it out from the can body 10', as seen in Figure 10, to provide the space at the very top of can, both for complete cooling of contents and for congealed moisture to become effective for locking the flange on the can.

The turning inward toward the axis of the stock which constitutes the walls of the can, at the bottom margin, makes a stiff support or seat for the stiff disk which is to be inserted to constitute the bottom; but it will be observed that this bead serves merely as a supporting ledge, and that the ledge might be provided by any suitable means, not necessarily integral with the body, and not necessarily continuous around it. Because of this construction the walls of the can body can extend imperforate to the extremity of the bottom of the can, exteriorly, and afford in themselves sufficient circumferential strength to prevent any spreading of the bottom part of the can beyond the degree which is cylindrically perfect. This does away with all need for outside metallic reinforcements, and for metallic ledges projecting inward to constitute a seat for the bottom. The can may, therefore, be constituted substantially wholly of paper, such incidental matters as the glue in holding two or three ply of paper, together, or metallic fasteners holding the cylindrically wrapped paper ends together if such be used, being so inconsequential that they can be ignored, saying that it is "wholly" of paper.

It is one of the advantages that the paper is initially "set" in the desired final form of can, i. e. cylindrical, if the manufacture starts with tubular paper stock, and that the resilience of the paper tends to return it to that form whenever the knocked-down can is released from its compression into flatness. Nevertheless, if it be preferred the manufacture may begin with the paper in flat form, folded with its ends secured together so as to be circumferentially continuous and capable of being opened out to a cylindrical form against the native resilience of the paper; but in such case it would be preferred first to roll the stock, bending it toward cylindricity, so as to reduce this inherent opposition, and then to flatten it again before going through the operation just mentioned of uniting its ends to cylindrical continuity, or in some other way to give it an aptness for cylindricity before flattening it as a completed knocked-down element of the can.

In many cases it is advantageous to omit the bead or roll 12 at the top of the container, as shown in Figure 10, in which case the material pressed out at the tops of the creases 18 and 19 will engage and center the cover flange, and so provide a space between flange and can body with the same effect as heretofore described. If the described flange clearance space is not wanted, as may happen in some cases, the creases may be stopped short of the top edge of the body, and the cover may then fit closely and smoothly as is ordinary for covers.

We claim as our invention:

1. A knock-down can comprising a normally cylindrical paper body of plural ply helically wound, the curvature of whose walls is a built-in characteristic which persists in individual sections of the wall independently of the effect of connection to other sections thereof; said walls being folded on diametrically opposed longitudinal lines which define arcuate individual sections of wall, and opposite wall portions being pressed together into approximate flatness; said walls being strongly resilient, and said flattened portions thereof being thereby adapted to spring by inherent resilience to approximately cylindrical arc form when the said folded body is opened and one end of it is made circular.

2. A knock-down can, comprising, in combination, a normally cylindrical body having longitudinal parallel creases dividing the body walls into a plurality of arcuate sections, the curvature of each of which is resiliently persistent, independently of each other section; said body being collapsible toward its axis by pressing its said sections flat together, and the resiliency of said sections being such that each springs to arcuate form when the flattening pressure is removed.

3. A knock-down can made of paper, comprising a tubular body of plural ply helically wound paper stock wherein a plurality of parallel longitudinal crease lines divide the body walls into arcuate sections, each having inherent curvature which persists resiliently independently of other sections; and said creases constituting hinges for the respective wall sections permitting the sections to be pressed together into flat, collapsed form; the said resilience of sections being to an extent whereby each springs to arcuate form when the flattening pressure is removed.

4. A knock-down paper can comprising a tube made of plural ply sheet paper organized in the tube with the respective plies adhering together and each substantially free of tension imposed upon it by an adhering adjoining ply, whereby the composite wall structure is free of internal stresses when occupying the curvature which is normal for the tube, and whereby said curvature is resiliently persistent in individual sections of the walls; said tube having longitudinal creases at diametrically opposed locations, dividing the tube walls into sections, whereby, by folding at the creases and by flattening of the sections of resilient walls between those folds, the tube can be collapsed, and when collapsed tends resiliently to open itself toward cylindrical form; said tube having means to hold a bottom seated within the tube; combined with said bottom, adapted to be inserted to said seat for fitting and spreading the tube.

5. A can, comprising a can body having sectional paper walls and having longitudinal, parallel hinges of the paper stock joining the respective sections and permitting movement of the sections relatively for converting the can body between an expanded tubular shape and a collapsed flat shape; each said section having initially a flexibly resilient arcuate form which yields to pressure applied in the collapsing, and each having its said resilience sufficient to spring it from a collapsed flat form to arcuate form when the collapsing pressure is removed; and said walls being circumferentially continuous, and extending imperforate to the extremity of the exterior bottom of the can, and having at their bottom margin, on their side toward the axis, a stiffly held seat for the can bottom; combined with said can bottom, being a disk which when inserted rests on and wholly above said seat and within the enclosure made by said walls.

6. A knock-down can, comprising, in combination, a normally cylindrical body having longitudinal parallel creases dividing the body walls into a plurality of arcuate sections, the curvature of each of which is resiliently persistent independently of each other section; each said crease being protuberant exteriorly adjacent to an end of the can body for spacing a flange of a cap cover from said body; and the said creases providing for relative movement of the sections in collapsing of the can.

7. The method of making a knock-down paper can, comprising the forming of paper stock as a cylindrical tube; the stock in the tube walls being resilient, and being in its condition of least internal stress when the walls are near cylindrical shape, whereby the tube walls when distorted tend to return to the cylindrical shape; forming therein around the margin at one end a seat for the can bottom; creasing the tube longitudinally on lines which are diametrically opposite, thereby dividing the walls into a plurality of arcuate sections; collapsing the tube into flatness by compression toward the axis, with the tube walls folding on said creases, and between the creases bending resiliently from curved toward flat shape, whereby the can becomes knocked-down; and completing the can by releasing the pressure, whereby the can opens itself resiliently, and by inserting and pressing a stiff disk bottom to said seat, whereby the bottom portion of the can is spread and locked open.

8. A knock-down container body comprising a multi-ply paper wall having an inherent substantially circular cross section, said wall having a plurality of circumferentially spaced weakened lines extending in a direction axially thereof with said weakened portions defining individual arcuate sections whose curvature is a built-in characteristic of said wall which persists in said individual sections independently of connection to other sections thereof, said body being collapsible toward a plane passing through its axis by relatively moving said sections toward said plane about the said lines as hinges to substantially reduce the volumetric space occupied by said body in its substantially circular condition while retaining said persistent curvature in said individual sections, and means adjacent one end of said wall to cooperate with an end to be inserted therein as a bottom serving to spread said body to substantially circular cross section.

9. A knock-down container body comprising a multi-ply paper wall having an inherent substantially circular cross section, said wall having a plurality of circumferentially spaced weakened lines extending in a direction axially thereof with said weakened portions defining at least four individual arcuate sections whose curvature is a built-in characteristic of said wall which persists in said individual sections independently of connection to other sections thereof, said body being collapsible toward a plane passing through its axis by relatively moving said sections toward said plane about the said weakened portions as hinges to substantially reduce the volumetric space occupied by said body in its substantially circular condition while retaining said persistent curvature in said individual sections, and means adjacent one end of said wall to cooperate with an end to be inserted therein as a bottom serving to spread said body to substantially circular cross section.

10. A knock-down container body comprising a multi-ply paper wall having an inherent substantially circular cross section, said wall having a plurality of circumferentially spaced weakened lines extending in a direction axially thereof with said weakened portions defining individual arcuate sections whose curvature is a built-in characteristic of said wall which persists in said individual sections independently of connection to other sections thereof, said body being collapsible toward its axis by relatively moving said sections toward each other about the said lines as hinges to substantially reduce the volumetric space occupied by said body in its substantially circular condition while retaining said persistent curvature in said individual section, a substantially circular relatively stiff bottom member serving when inserted within said wall to spread said wall to open condition, and means adjacent one end of said wall to cooperate with said bottom for positioning the same in said body.

11. A knock-down container body comprising a multi-ply paper wall of substantially circular cross section, said wall having a plurality of circumferentially spaced weakened lines extending in a direction axially thereof with said weakened portions defining individual arcuate sections, said weakened portions providing hinges for permitting relative movement of said sections, said sections being constructed to maintain substantially their original circular curvature when the body is bent about certain of its hinges to approach collapsed condition, and means adjacent one end of said body to cooperate with an end to be inserted therein as a bottom serving to spread said body to substantially circular cross section.

12. A can, comprising a can body having sectional paper walls and having longitudinal, parallel hinges of the paper stock joining the respective sections and permitting movement of the sections relatively for converting the can body between an expanded tubular shape and a collapsed flat shape; each said section having initially a flexibly resilient arcuate form which yields to pressure applied in the collapsing, and each having its said resilience sufficient to spring it from a collapsed form to arcuate form when the collapsing pressure is removed; and said walls being circumferentially continuous, and extending imperforate to the extremity of the exterior bottom of the can, and having at their bottom margin, on their side toward the axis, a stiffly held seat for the can bottom; combined with said can bottom, being a disk which when inserted rests on and wholly above said seat and within the enclosure made by said walls.

ALBION M. BOOTHBY.
MARSHALL E. GAZETTE.